(12) United States Patent
Oehlbeck et al.

(10) Patent No.: US 6,778,290 B2
(45) Date of Patent: Aug. 17, 2004

(54) PRINTING IMAGE FRAMES CORRESPONDING TO MOTION PICTURES

(75) Inventors: Martin E. Oehlbeck, Rochester, NY (US); Rockwell N. Yarid, Churchville, NY (US); Richard L. Druzynski, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 249 days.

(21) Appl. No.: 09/935,613

(22) Filed: Aug. 23, 2001

(65) Prior Publication Data

US 2003/0038764 A1 Feb. 27, 2003

(51) Int. Cl.⁷ .............................................. G06F 15/00
(52) U.S. Cl. ..................................... 358/1.15; 358/509
(58) Field of Search ................................ 358/1.9, 1.13, 358/1.14, 1.15, 504, 518, 506, 509, 513, 526

(56) References Cited

U.S. PATENT DOCUMENTS

| | | | |
|---|---|---|---|
| 4,635,082 A | * | 1/1987 | Domoto et al. ............. 346/160 |
| 4,754,334 A | | 6/1988 | Kriz et al. |
| 5,047,861 A | | 9/1991 | Houchin et al. |
| 5,061,049 A | | 10/1991 | Hornbeck |
| 5,296,958 A | | 3/1994 | Roddy et al. |
| 5,325,137 A | | 6/1994 | Konno et al. |
| 5,461,411 A | | 10/1995 | Florence et al. |
| 5,652,661 A | | 7/1997 | Gallipeau et al. |
| 5,701,185 A | | 12/1997 | Reiss et al. |
| 5,743,610 A | | 4/1998 | Yajima et al. |
| 5,745,156 A | | 4/1998 | Federico et al. |
| 5,808,800 A | | 9/1998 | Handschy et al. |
| 5,844,663 A | * | 12/1998 | Holley et al. ................. 355/32 |
| 5,970,215 A | | 10/1999 | Stephenson |
| 6,016,157 A | | 1/2000 | Stephenson |

FOREIGN PATENT DOCUMENTS

DE   100 63 200   6/2001

* cited by examiner

Primary Examiner—Mark Wallerson
(74) Attorney, Agent, or Firm—Raymond L. Owens

(57) ABSTRACT

A method of printing image frames from a digital image file of a motion picture includes providing a two-dimensional LCD modulator having predetermined pixels which selectively can be activated so as to respond to incident light to provide monochromatic visual images; responding to the digital image file to activate the pixels in the LCD modulator to provide visual image planes corresponding to each frame of the motion picture; and moving a photosensitive medium past the LCD modulator to illuminate different portions of such medium from the illuminated LCD modulator to record the image planes on such medium.

10 Claims, 3 Drawing Sheets

PRINTING IMAGE FRAMES CORRESPONDING TO MOTION PICTURES

FIELD OF THE INVENTION

The present invention relates to a method of printing image frames from a digital image file of a motion picture.

BACKGROUND OF THE INVENTION

Digital images have been printed onto a photosensitive medium using a liquid crystal display (LCD) as a modulator. The image presented on the LCD modulator is optically focused on the medium and a source or sources of light is allowed to illuminate the LCD modulator, which then creates a latent image on the medium. The wavelength of the light source needs to be carefully selected or tuned to match the spectral sensitivity of the medium in order to create an image with color and density as was intended by the data in the digital image file. When printing images on traditional color motion picture film, three primary sources of monochromatic red, green and blue light would be used to illuminate the LCD modulator to create the image. Each primary color corresponds to one of the three separable color records in the digital image data and color planes on the medium. For a single LCD modulator, each of the three separable planes on the medium would be exposed sequentially by the respective separable color records in the image file and the illumination source. The wavelength of these sources would generally be in the approximate range of 650 nm (red), 540 nm (green) and 450 nm (blue). For a monochromatic image only one image plane is on the medium, therefore only one of the three sources of light would be used to create the image. The choice of the illumination source wavelength would depend on the spectral sensitivity of the medium.

Digital motion picture image printers in use today uses a variety of technologies to perform the task. These systems employ technologies that are based on cathode ray tubes (CRT), raster scan laser beam and electron beam writing engines. These technologies as used in their current level of maturity are known to have inherent limitations. CRT systems such as that described in U.S. Pat. No. 4,754,334 are slow and generally do not have the capability to create images that make use of the full exposure range of the motion picture film because of the low radiance output of the CRT. It takes approximately 20 seconds to print a 2 k-resolution full aperture image using this system. The raster scan systems employs a spinning mirror called a scanner to impart motion to a focused modulated laser beam to expose and build the image one pixel at a time. A 2 k-resolution image can contain over 6 million pixels. The raster scan system may contain a single mirror or multi-mirror scanner. The limitations in such systems as described in U.S. Pat. No. 5,296,958 are due primarily to the limitations in speed of the scanner. The raster scan system is also relatively complex in its construction. It is estimated that the top end printing speed in a single beam, single scanner system is about 0.2 seconds per a 2 k-resolution image using current commercial components and technology. Electron beam systems are complex and the need to use special film types is a hindrance.

It is not practical to simply scale up these systems in order to gain speed. As an example, in order to print faster using a raster scan laser beam recorder, one could increase the speed of the scanner. Single mirror scanners (monogons) currently operate at approximately 65,000 RPMs, which is approximately the top end of their capabilities. Multi-mirror scanners (polygons) with 16 mirror facets are currently used today operating at approximately 6,500 RPM. In order to print faster, the scanners will have to operate at higher speeds but there are practical limitations relative to speed, the number of scanner mirrors, and the diameter of the scanner disk and cost. For example, the scanner motor loading varies as a function of the fifth power of the diameter and the square of the speed. It is possible to go faster but such an effort would result in added complexity, such as placing the scanner in a vacuum chamber to protect it and reduce drag. The power density of the writing spot may have to increase and the exposure time may have to decrease which could lead to reciprocity failures in the photosensitive medium.

A single two hour motion picture film sequence contains 172,800 high resolution discrete images. It is becoming common to see more motion picture films originating from digital sources. To this end, there is a need to be able to print these images in totality in a very short period of time to meet the needs of the digital mastering market. Using the best of the current technologies it would take approximately 192 hours to print these 2 k resolution images on 35 mm film using one machine. There is a need in the industry to reduce this time to less than 10 hours.

Two-dimensional spatial light modulators, such as those using a digital micromirror device (DMD) from Texas Instruments, Dallas, Tex., or using a liquid crystal display (LCD) from Victor Company of Japan, Limited (JVC) can be used to modulate an incoming optical beam for imaging. A spatial light modulator can be considered essentially as a two-dimensional array of light-valve elements, each element corresponding to an image pixel. Each array element is separately addressable and digitally controlled to modulate incident light from a light source by modulating the polarization state of the light. Polarization considerations are, therefore, important in the overall design of support optics for a spatial light modulator.

There are two basic types of LCD spatial light modulators currently in use, transmissive and reflective, respectively. Spatial light modulators have been developed and used for relatively low resolution applications such as digital projection systems and image display in portable devices such as TV and helmet display. Applications and teachings can be found in U.S. Pat. Nos. 5,325,137, 5,808,800, and 5,743,610. The requirements for projection and displays systems differs significantly from the requirements for high resolution printing to a photosensitive medium as would be required, for example, by the motion picture industry. The images from the first generation high resolution photosensitive medium will ultimately be used for creating a print film to be used for projection on a screen in a theatre. The process for creating the final projectable photosensitive medium would involve several generations of duplications and modifications by computer systems prior to the creation of the projectable medium. When viewing these intermediate high resolution photosensitive medium outputs or electronically scanning the original medium with a high resolution scanner, image artifacts, aberrations and nonuniformity will be more obvious. Optical systems for projectors and display applications are designed for the response of the human eye which, when viewing a display, is relatively insensitive to image artifacts, aberrations and nonuniformity, since the displayed image is continually refreshed and is viewed from a distance. Even more significant are differences in resolution requirements. Adapted for the human eye, projection and display systems are optimized for viewing at typical resolutions such as 72 dpi or less, but photographic printing used in the motion picture industry is generally printed at resolutions in excess of 1900 dpi. As a result of these requirements the optical, illumination, and image processing systems for a motion picture printer used in the motion picture industry can vary significantly from the aforementioned systems.

The current available resolution using digital micromirror device (DMD), as shown in U.S. Pat. Nos. 5,061,049 and 5,461,411 is not sufficient for the printing needs of the motion picture film industry and there is no clear technology path to increase the resolution. DMDs are expensive and not easily scaleable to higher resolution.

Low cost solutions using LCD modulators are described in U.S. Pat. Nos. 5,652,661, 5,701,185, and 5,745,156. Most involve the use of transmissive LCD modulators. While such a method offers several advantages in ease of optical design for printing, there are several drawbacks to the use of conventional transmissive LCD technology. Transmissive LCD modulators generally have reduced aperture ratios and the use of transmissive field-effect-transistors (TFT) on glass technology does not promote the pixel-to-pixel uniformity desired in many printing applications, especially that required in high resolution motion imaging. In order to provide high resolution, the transmissive LCD modulator's footprint would have to be several inches in both dimensions, which would make the design of a practical output projection lens unreasonable in both cost and size. Transmissive LCD modulators are constrained to either low resolution and/or small images unsuitable for use in motion picture industry applications.

Another spatial light modulator that can be used is a single digital image light amplifier (SD-ILA) LCD. This device incorporates an integral RGB color separating holographic filter that focuses the RGB components of full white light spectrum of an illumination source onto RGB sub-pixels of each pixel in the modulator. Such a device is available from Victor Company of Japan, Limited (JVC). The apparent benefit of this device is the ability to use a single white light illumination source instead of RGB monochromatic color illumination sources to expose the medium and create an image. The problem with these devices in the motion picture printer application is that to obtain the needed high resolutions of 6 to 12 micrometer pixel pitch on 35 mm motion picture film, the LCD modulator would be relatively large. The design of the output projection lens would be costly and complex. Convergence of the three colors in a pixel would also be potentially a problem creating apparent and unacceptable color shifts and other artifacts in the image.

SUMMARY OF THE INVENTION

It is therefore an object of the present invention to provide an apparatus that minimizes the above noted problems while making use of commercially available elements.

It is another object of the present invention to make use of a reflective LCD modulator in the conversion of black and white and color digital images from a motion picture onto a photosensitive medium.

This object is achieved by a method of printing image records from a digital image file of a motion picture, comprising the steps of:
 a) providing a two-dimensional LCD modulator having predetermined pixels which selectively can be activated so as respond to incident light to provide monochromatic visual images;
 b) responding to the digital image file to manipulate the digital information contained therein to achieve desired effects in the images to be printed to the medium;
 c) responding to the digital image file to activate the pixels in the display to sequentially illuminate the activated LCD modulator to provide visual image planes to provide images corresponding to each frame of the motion picture; and
 d) moving a photosensitive medium past the display to illuminate different portions of such medium from the illuminated LCD modulator to record the image planes on such medium.

This object is further achieved by an apparatus for printing a plurality of frames wherein each such frame includes at least three separable color image records from a digital image file of a color motion picture, comprising the steps of:
 a) means for receiving and storing the digital image file of the motion picture sequence;
 b) an activatable two-dimensional reflective LCD modulator having predetermined pixels in which different colored monochromatic visual images corresponding to each motion picture frame can be produced;
 c) means for activating the two-dimensional reflective LCD modulator in response to the digital image file so that reflective light will cause a visual image to be produced;
 d) at least three arrays of spaced light-emitting diodes and each such array operates at a different color wavelength wherein each such color wavelength corresponds to an image plane;
 e) an optical assembly for receiving light from each array and for distributing such light to provide a relatively uniform light beam;
 f) a first polarizer responsive to the uniform light beam to polarize such uniform light beam;
 g) a beam splitter for receiving the uniform polarized light beam and for directing a portion of the uniform polarized light beam onto the activated LCD modulator and for receiving and directing reflected light from the LCD modulator;
 h) a second polarizer responsive to directed reflected light from the LCD modulator to minimize noise; and
 i) means for moving a photosensitive medium past the reflective light produced by the second polarizer to illuminate such medium for a sufficient time with the visual image planes to record such image planes on such medium at proper exposure which matches the medium sensitivity.

ADVANTAGES

The present invention is particularly suited for printing frames of either black and white or color motion pictures, such motion pictures can either be generated by a digital camera, scanned from images recorded on a photographic medium or can be computer generated digital images.

In the preferred embodiment of the invention, a reflective liquid crystal display can be effectively used to produce image frames. The present invention can make use of light-emitting diodes having particular wavelengths and an arrangement for using light produced by such arrays to efficiently illuminate the reflective LCD modulator.

The present invention using a reflective LCD modulator in a printer system offers some novel solutions to the current problems. It is known in the prior art that digital images residing on a computer can be decomposed into its representative color records and each color record can be written singularly to the LCD modulator. U.S. Pat. Nos. 6,016,157 and 5,970,215 use such a technique to create color prints using a single transmissive LCD modulator in a portable printer system. This invention works well in the particular applications where the need to print images do not exceed the limitations of the components and technologies. Specific limitations of the aforementioned patents would be the light energy needed to expose the photosensitive medium at very high speeds and the relatively low resolution of the transmissive LCD modulator. As is pointed out in the aforementioned patents, the object of the invention is aimed at a compact low energy battery powered system. Simply scaling up the system is not a practical solution to the speed problem, which would require major innovations in technology and designs yet to be developed.

DETAILED DESCRIPTION OF THE INVENTION

Figure 1:
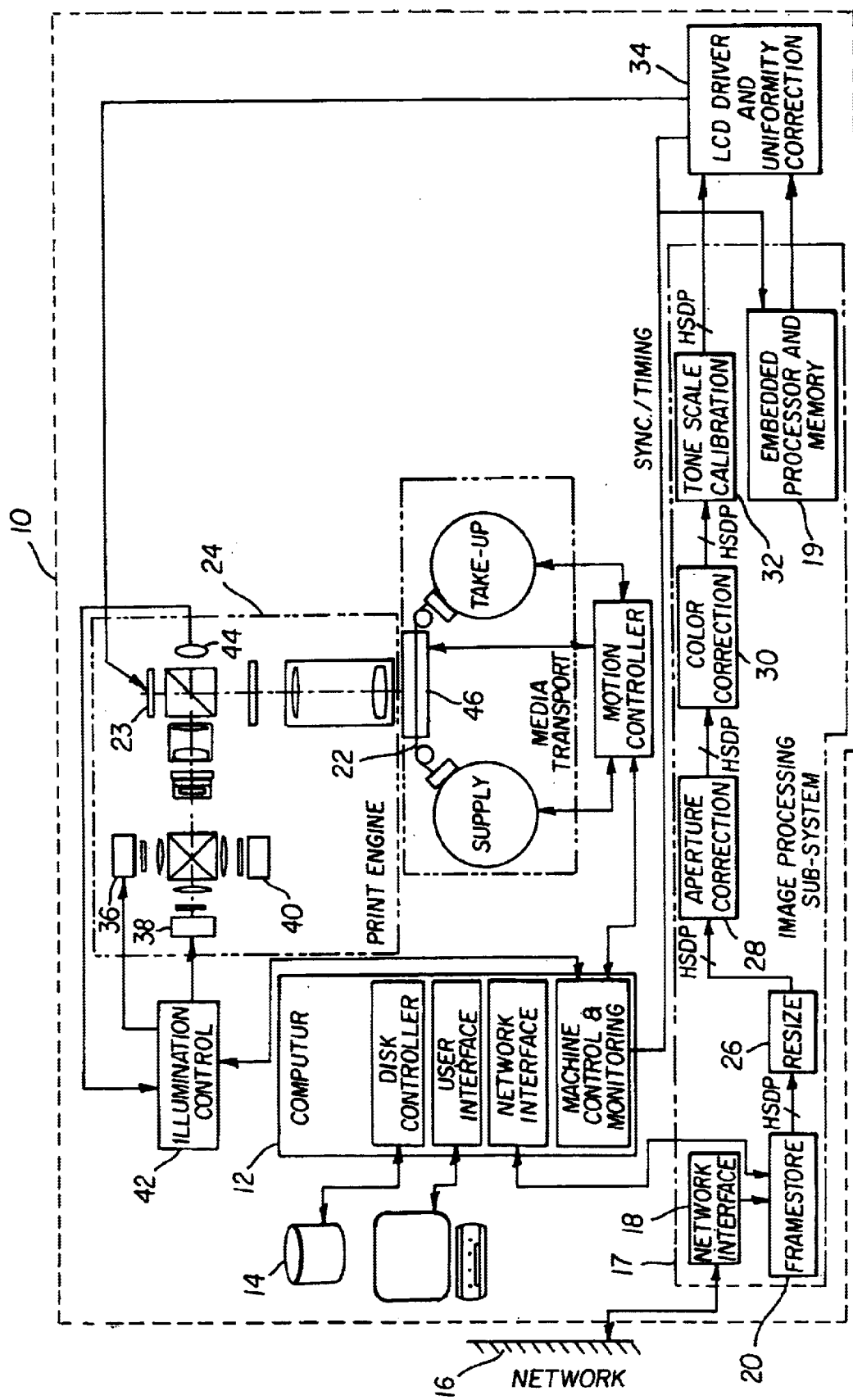
FIG. 1 is a schematic diagram of an apparatus for printing image frames corresponding to a motion picture film sequence in accordance with the present invention.

Turning now to FIG. 1, an apparatus 10 for printing at least three separable image planes from a digital image file of a motion picture where such a file is stored on a computer's 12 local disk 14 or on any convenient digital file storage means accessible to the computer where such means could be on an external network 16 storage means. As will become clearer, the image digital file will be used to activate the LCD modulator to provide digital image planes. Network interface 18 provides a common entrance point for the digital image file to be retrieved from the external network 16, whereas image files from the local disk would enter directly into the framestore 20. The apparatus 10 responds to the digital image file that contains discrete digitized color motion images or discrete digitized black and white motion images from which are produced light or visual images to be recorded on the photosensitive medium 22. The light images correspond to at least one or more separable monochromatic color image records from the digital image file of the color or black and white motion picture frame.

Digital images can be created from the output of a digital motion or still image camera or by computer generated graphics or by digitally scanning photographic images off of a photosensitive medium. The means of storing digital images are varied which could include storage on compact optical disk, magnetic tape, or traditional computer disk. Once stored in a file they can be made accessible to computer systems where they can be manipulated and viewed. It is very important that the digital images, when created and stored, are stored in some standard graphical image format such as JPEG, TIFF or DPX. A format defines how the digital information should be interpreted in order to reconstruct the image. A series of images, each called a frame, which differ from each other in a small and ordered sequence and viewed in this sequence at some specific frame rate, will give the effect of motion to an observer. This is the process used for projecting a movie on a screen for well over 90 years.

The apparatus 10 includes an activatable two-dimensional reflective LCD modulator 23, contained within an optical assembly called a print engine 24, having predetermined pixels in which different colored monochromatic visual images corresponding to each motion picture frame can be produced. Each pixel can be selectively activated. Such reflective LCD modulator devices are manufactured by Victor Company of Japan, Limited (JVC), Three-Five Systems, Inc., Tempe, Ariz. and others. The print engine 24 receives light from colored light sources and distributes such light to provide a relative uniform light beam. The LCD modulator 23 responds to incident light in order to create visual images which are recorded on a photosensitive medium.

In order to activate the activatable two-dimensional reflective LCD modulator, the following circuitry responds to the stored digital image as follows. A digital color image frame is comprised of one or more visual image planes each of which is a composite of pixels arranged in two dimensions which defines the aperture. The SMPTE 59-1998 standard defines the apertures used on 35 mm motion picture film. Each pixel is created on the medium using digital data from one or more of the separable monochromatic color records corresponding to one or more of the separable color image planes on the photosensitive medium 22. In the case of a black and white images intended for black and white photosensitive medium 22 there is only one monochromatic image plane, therefore only one data file record is required. In the case of true color images, there are generally three data file color records and three image planes on the photosensitive medium 22.

Each color record defines the densities of the pixels for that color plane. Density might be measured, for example, in a metric such as Status M, Status A, or printing density depending on the types of photosensitive medium 22 to be used. The density of the pixel can be represented by a value of some magnitude, which is referred to as the color bit depth. Such a magnitude can be represented by a digital value of n bits. An 8 bit value has a bit depth of 256 discrete density levels, and a 10 bit value has 1024 discrete density levels.

The digital image is transferred one frame at a time to the framestore 20 in the image processing sub-system 17 from the storage means 14 or 16. The image processing sub-system 17 provides a collection of processing functions that is configurable and controlled by the embedded processor 19. The processing of data requires a very high speed data path that may not be provided for within the general computer 12. The image processing sub-system 17 may be a specialized high speed external computer or a peripheral processing card or collection of cards within the computer 12. High speed processing elements such as FPGAs or ASICs might be employed to process the image data according to formware program control.

The framestore 20 can hold several images at any one point in time depending on a number of design and operational needs, but generally only one image at a time is processed for printing. The framestore might perform simple data manipulation such as line reversal for printing positive or negative images where the physical placement of the image on the medium between a positive and negative image frame is different.

Each separable color record of a frame is then transferred from the framestore into one or more image processing elements as is dictated by the needs of the user. Image processing elements 26, 28, 30, 32 manipulate the digital image data to achieve certain results on the medium. These techniques are known in the art and can involve the process of resizing the digital image to increase or decrease the physical aperture size on the medium. Another process known as aperture correction is used to correct pixel defects that may have occurred as a result of data transmission of the digital image data. Aperture correction may also be used to sharpen or blur the image.

A color correcting processing step that can be performed on the digital image data is called color correction. The use of color correction may come as a result of the need to print the same images on different stock or batches of the photosensitive medium 22 or to match the spectral sensitivity of the medium. In some cases the image data is manipulated to achieve some special effects in the color mix of the image.

Tone scale calibration 32 provides a compensation to the digital image data that will correct for variability in the medium stock emulsion, chemical processing of the medium, and variations within the LCD modulator and/or optics. The purpose of tone scale calibration is an effort to produce an image that is consistent with the representation of the digital image regardless of medium stock, printer, and medium process variations. The digital image data may represent pixels in an image that are all of the same color and density, this is known as a flat-field image and is often used for image analysis purposes. A flat-field image, when printed without tone scale calibration, could result in a relatively higher or lower density than that which was defined in the digital image file. Tone scale calibration can also adjust the data prior to printing, using prior knowledge about the aforementioned variables to achieve the expected results. The image on the medium is adapted to meet the density and color requirements defined by the digital image data.

Another image processing need is that of file conversion. As was stated digital image files could be stored in many different standard formats (i.e. TIFF, JPG, DPX to name a few). Most of these standard formats have additional data that carries information about the file structure and content such as compression information if compressed, color bit depth, color data order sequence, sometimes even sub-sampled images. This additional information needs to be removed before the image can be presented to the LCD modulator. The image processing sub-system would need to convert all incoming digital image files to a standard internal native data format void of this additional non image content information. It is possible to convert between many of these formats. The embedded processor 19 could perform file conversion on the digital image file frames as they are received form the storage means to the internal format needed by the image processing sub-system.

The imaging area of an LCD modulator is a composite of pixel sites similar to the aperture format of an image frame. The number of pixel sites and two-dimensional spacing of them defines the resolution of the device. Current devices have resolutions of 2048×1536 pixels. It is very important in high resolution imaging applications that all sites have uniformly reflective transfer characteristics. Ideally, all pixels in the modulator should have equal reflectivity over the full effective dynamic reflectance range within some specified tolerance. If this situation is not met, objectionable artifacts can result and be noticeable on the medium. Relative variations of 0.002 density on motion picture film negative (i.e. Eastman Kodak Company ECN 5244) will be perceived as objectionable by the human observer when printed to print film and projected on a screen. This variation on film of 0.002 density can be the result of reflection variations in pixel sites of ½%. Reflectance variation in the LCD modulator is a static characteristic that is the result of process variations at the time of manufacturing.

In the uniformity correction section of the LCD driver 34, in a simple form of correction, a predetermined correction factor is applied by adjusting gain and offset for each pixel within the LCD modulator to reduce the reflectance variations of the system to within specified limits at the time of printing the image. A patent of interest for its teachings in this area is U.S. Pat. No. 5,047,861. In this patent the method and means of providing for this correction can be implemented by programmable look-up tables. One method of deriving the correction factors for each pixel would require printing a full aperture flat-field image on the medium with no correction compensation applied to the LCD modulator. A flat-field image is a digital image wherein all pixels are of the same density. It is preferred that the density of the image is approximately mid-scale. The flat-field image on the medium is digitized at the maximum image aperture size and resolution to produce density data for all pixels in a color plane. A high resolution scanner or microdensitometer can be used to digitize the image. A resulting uniformity data map digital file is created from which relative variations in pixel reflections on the LCD modulator can be determined. The data is converted from log space (density) to linear space (intensity) and the median reflectance level is determined. The correction factor for each pixel is the percentage deviation from the median point of each pixel in a color frame. These correction factors are applied to the image data by the LCD driver/uniformity correction board 34 at the time of printing an image.

The correction factors from the uniformity data map could be used to correct the image if applied to the digital image file directly while the data is in log space (density). This would require more processing time and digital file storage or modifications to the original digital image file, which may or may not be desirable.

The reflectance correction values used by the uniformity correction 34 could vary as a function of the specific pixel on the LCD modulator 23, the color bit depth of the pixel, and as a function of the specific color plane. The reflectance of the pixel site on the LCD modulator is controlled by the density code value in the digital image file. It might be necessary, therefore, to provide many correction values where the number of correction values equal the product of the number of pixels in an LCD modulator, the number of separable color planes, and the color bit depth of each pixel. This represents a very large number of discrete values that are stored on computer 12 and loaded to the LCD driver at power up. There are a number of more efficient means of applying this correction, which is not within the scope of this invention to derive and is known to the art. The corrected image data is presented to the LCD modulator 23 in accordance with the specific requirements of the device manufacturer.

In a preferred embodiment, there are at least three arrays of spaced red, green, and blue light-emitting diodes LED's, 36, 38, and 40 called the illumination sources. It is necessary to control the absolute light power output of each array as well as the time duration that the arrays are turned on and radiating light. The combination of the magnitude of the light power output and the time duration is known as the film exposure value. The log of the exposure value determines the density of the images on the medium. The standard equation $D=\log H$ is very commonly used in the industry to define this relationship, where D equals density and H equals exposure in lux-seconds. Controlling the magnitude and time of the illumination sources limits the maximum density for each color plane, respectively, while the LCD modulator controls, dynamically, the density of each pixel for each color plane, respectively, within this limit of the exposure control.

These light-emitting diodes (LEDs) are controlled by the following elements. The LEDs emits radiant energy in proportion to the forward current through the diode junction. The relationship between forward current and emitted radiant energy is very close to being a linear function. The maximum forward current is limited by the specific devices and manufacturers. A typical maximum continuous value for such a device manufactured by Nichia America Corp. is in the range of 30 to 50 milliamps, with radiant power output of approximately 3 to 5 milliwatts in the 400 to 700 nanometer wavelengths. These devices can be operated in a pulsed mode as long as the pulse duration and duty cycle are not exceeded. In the pulsed mode, a 50% increase in radiant output levels can be realized for the short duration of the pulse.

It is the function of the illumination control 42 to control the illumination sources 36, 38, 40 such that any desired level of power output, within the limits of the devices, can be set by the computer 12 under application software control. Input values to the illumination control could be an analog voltage from the computer for each color channel that represents 0 to 100% power output at the medium plane. In order to set the power output of the illumination sources 36, 38, 40 to a specific value, a data profile of the response of input voltage versus power output would be generated and stored on the computer. Light power at the medium plane is sensed by a photosensor 44 in the optical assembly, and the values read and stored by the computer 12. In this process, the LCD modulator is set to maximum effective reflectance, and the analog voltage input to the illumination control 42 is varied from 0 to maximum in discrete steps, and light power for each step is recorded. The resulting transfer functions can be used by the computer, in a simple look-up table fashion, to arbitrarily set the magnitude of the illumination sources.

The illumination control 42 controls the overall activity of the arrays in response to commands from the computer 12 and to the measured power output of the photosensor 44. Under program control from the computer the photosensitive medium 22 is positioned such that an unexposed area of the medium is located in the film gate 46. One or more color records of an image frame is singularly or sequentially, as is applicable, used to activate the LCD modulator 23. Once the image on the LCD modulator 23 is stable, the illumination control 42 will activate the illumination sources for the respective color record using a predetermined exposure time and power output level, which creates a latent image on the medium of the image on the LCD modulator. This sequence of exposing each of the color records for each frame is repeated for all color records. Then, after an unexposed area of the medium is again positioned to accept the next image frame, the entire aforementioned sequence is repeated. This process is repeated until all images in the digital image motion picture sequence file have been imaged onto the medium.

Figure 2:
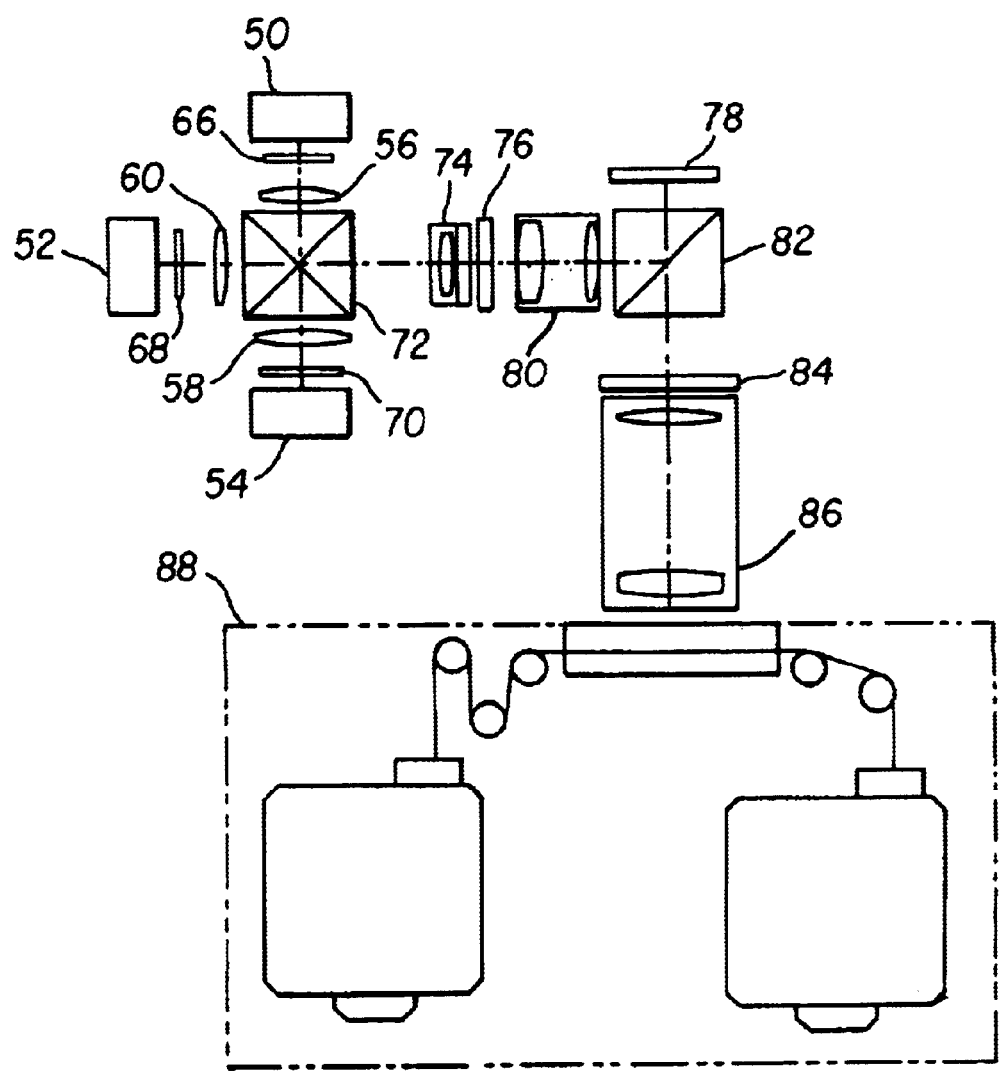
FIG. 2 is a schematic diagram showing in more detail the optical assembly of the apparatus in FIG. 1.

The print engine 10 is shown in more detail in FIG. 2. Turning now to FIG. 2, the print engine includes separately spaced red, green and blue illumination sources shown as LED arrays 50, 52 and 54, readily available from a variety of manufacturers, emit narrow wavelength ranges of light. The emitted wavelength ranges of the separately spaced LED arrays are further narrowed by spectral trim filters 66, 68 and 70 to reduce the potential of crosstalk exposure in the individual color emulsion layers of photosensitive medium 22, and are specified to match the spectral sensitivity of the medium. The red, green and blue LED arrays 50, 52 and 54 are sequentially actuated, depending on the color information contained in the digital image file, and in response to control signals provided by illumination control 41, to expose the image on the medium one color emulsion layer at a time.

Condensing lenses 56, 58 and 60 collects light and efficiently projects it along the optical path. Surfaces internal to an X-cube prism 72 are coated with specific optical coatings that will allow either passage or rejection of specific wavelengths of light. These surface coatings are required to allow the three defined beams to exit the X-cube prism 72 on a coaxial path.

Those skilled in the art will recognize the possibility of removing spectral trim filters 66, 68 and 70 from the system and having the outer surfaces of X-cube prism 72 coated with wavelength range narrowing coatings as a replacement for the filters.

Uniformity optics section 74 of the illumination system collects the light as it exits the X-cube prism 72 and is conditioned by a lens to produce a collimated, uniform beam. An integrator in this section serves to provide uniform illumination and shapes the exiting beam into a rectangular aperture. Input polarization optics 76 receives the projected light beam and conditions it to be received by the two-dimensional LCD modulator 78 in a preferred linear polarity. Light beam relay and focusing optics 80 gather the uniformized light beam and sizes it appropriately to efficiently illuminate the two-dimensional LCD modulator 78. Once conditioned by the light beam relay and focusing optics, the light enters a polarizing beam splitter 82 and intersects its internal surface, at which time the light is partitioned into two discrete polarities referred to as the "S" and "P" planes. Light in the "P" polarity is allowed to pass through beam splitter and is extinguished. Light in the "S" polarity reflects off the beamsplitter internal surface at a 90-degree angle and illuminates the two-dimensional LCD modulator 78 to produce an image of the motion picture frame. Two-dimensional LCD modulator 78 is electronically activated in response to the digital image signal through the action of LCD driver 34. The LCD driver signals result in a proportional part of the uniformized and polarized light to be reflected off of the individual pixel sites of two-dimensional LCD modulator 78. The reflection percentage is in response to the digital image signal of LCD driver 34 and is therefore scene content dependent. During this reflectance, the "S" polarity light originally projected to the two-dimensional LCD modulator 78 is effectively rotated to the "P" plane which is, in turn, allowed to pass through the polarizing beam splitter 82. As the image-bearing beam passes through the polarizing beamsplitter, a small percentage of the image may become randomly polarized. The incorporation of output polarization optics 84 serves to reject this energy and increase contrast in the image.

Image projection optics 86 now collects the projected image and either minimizes or magnifies the image to obtain the desired image size and focuses it on the medium surface, registered within media transport system 88 and gate 90, thereby creating the exposure. Media transport system 88 includes the gate 90, which provides proper registration for the medium at the exposure point and supply and take-up cassettes that provide in-feed of unexposed medium to the gate or collects the medium after exposure. Also included in media transport system 88 is a tensioning system that allows the exposed medium to be reeled safely into the cassette without fear of damage.

Figure 3:
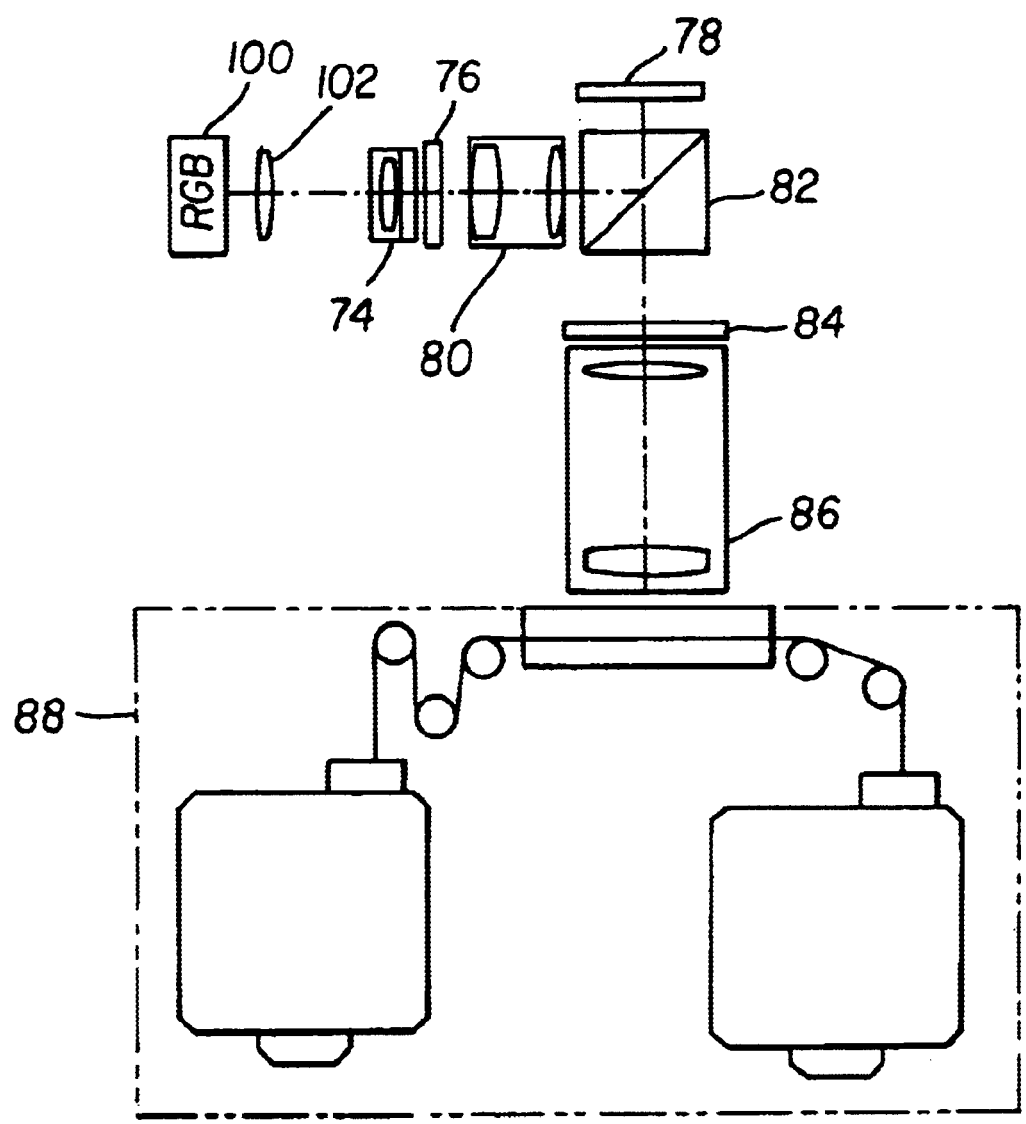
FIG. 3 is a schematic diagram showing in more detail a variation in the illumination system of the optical assembly of the apparatus in FIG. 1.

A variation to the discrete LED array illumination sources 50, 52, 54 is shown in detail in FIG. 3. Turning to FIG. 3, separately spaced red, green and blue LEDs (not shown) are combined into one RGB LED array 100. This type of illumination source is readily available from a variety of manufacturers and emits narrow wavelength ranges of light. The emitted wavelength ranges of the separately spaced LEDs are further narrowed by spectral trim filters over each desecrate LED (not shown) to reduce the potential of crosstalk exposure in the individual color emulsion layers of photosensitive medium 22 and are specified to match the spectral sensitivity of the medium. The red, green, and blue LEDs in the RGB LED array 100 are sequentially actuated, depending on the color information contained in the digital image file and in response to control signals provided by illumination control 41, to expose the image on the medium one color emulsion layer at a time. Condensing lens 102 collects light and efficiently projects it along the optical path. After this point, the remainder of the system functions similarly to that shown in FIG. 2.

The illumination configurations so far described in FIG. 2 and FIG. 3 can be reduced if it is only required to expose black and white medium. In such a case only one of the three LED arrays in FIG. 2 or one of the color LED groups in the LED array of FIG. 3 would be needed. The optical components with other modifications to reduce and simplify the optical design would produce a similar system to that of FIG. 3. In addition to the reduction of components, the system printing speed would increase.

The invention has been described in detail with particular reference to certain preferred embodiments thereof, but it will be understood that variations and modifications can be effected within the spirit and scope of the invention.

Parts List 12 computer
14 local disk
16 external network
17 image processing sub-system
18 network interface electronics
19 embedded processor (central processing unit) electronics
20 framestore electronics
22 photosensitive medium
23, 78 two-dimensional LCD modulator
24 print engine
26 resize electronics
28 aperture correction electronics
30 color correction electronics
32 tone scale calibration electronics
34 LCD driver/uniformity correction electronics
36, 50 red LED array
38, 52 green LED array
40, 54 blue LED arrays
42 illumination control
44 photosensor
46, 90 gate
56, 58, 60 condensing lenses
66, 68, 70 spectral trim filters
72 X-cube prism
74 uniformity optics (integrator)
76 input polarization optics
80 light beam relay and focusing optics
82 polarizing beam splitter
84 output polarization optics
86 image projection optics
88 media transport system
100 RGB LED array
102 condensing lens

What is claimed is:

1. A method of correcting nonuniformities in images on a medium wherein data to pixels of a LCD modulator are modified in an image processing sub-system, comprising the steps of:
   a) activating an uncorrected LCD modulator with a flat-field image of a mid-density value from a digital image file and recording such an image frame onto the medium;
   b) digitizing the resulting image frame at the full image aperture and resolution of the LCD modulator using a high resolution digital scanner or microdensitometer to obtain density readings for each pixel in all monochromatic image planes of the image frame;
   c) creating a uniformity data map digital file of percent variations in density readings for all pixels in an image for all monochromatic image planes in the image frame relative to a median density point for all pixels in an associated plane; and
   d) correcting all pixels in each image plane within the LCD modulator control to reduce density variations on the medium to an acceptable limit.

2. A method of correcting nonuniformities in images on a medium wherein pixels of a digital image file are modified, comprising the steps of:
   a) activating an uncorrected LCD modulator with a flat-field image of a mid-density value from a digital image file and recording such an image frame onto the medium;
   b) digitizing the resulting image frame at the full image aperture and resolution of the LCD modulator using a high resolution digital scanner or microdensitometer to obtain density readings for each pixel in all monochromatic image planes of the image frame;
   c) creating a uniformity data map digital file of percent variations in density readings for all pixels in an image for all monochromatic image planes in the image frame relative to a median density point for all pixels in an associated plane;
   d) correcting all pixels in each image plane within the digital image file to reduce density variations on the medium to an acceptable limit.

3. Apparatus for printing a plurality of frames wherein each such frame includes at least three separable color image planes from a digital image file of a color motion picture, comprising the steps of:
   a) means for receiving and storing the digital image file of the motion picture sequence;
   b) an activatable two-dimensional reflective LCD modulator having predetermined pixels in which different colored monochromatic visual images corresponding to each motion picture frame can be produced;
   c) an image processing sub-system for manipulating the digital image data from the digital image file to produce predetermined affects to the visual image;
   d) means for activating the two-dimensional reflective LCD modulator in response to the digital image data from the image processing sub-system so that reflective light will cause a visual image to be produced;
   e) at least three arrays of spaced light-emitting diodes and each such array operates at a different color wavelength wherein each such color wavelength corresponds to an image plane;
   f) an optical assembly for receiving light from each array and for distributing such light to provide a relatively uniform light beam;

g) a first polarizer responsive to the uniform light beam to polarize such uniform light beam;

h) a beam splitter for receiving the uniform polarized light beam and for directing a portion of the uniform polarized light beam onto the activated LCD modulator and for receiving and directing reflected light from the LCD modulator;

i) a second polarizer responsive to directed reflected light from the LCD modulator to minimize noise; and j) means for moving a photosensitive medium past the reflective light produced by the second polarizer to illuminate such medium for a sufficient time with the visual image planes to record such image planes on such medium at proper exposure which matches the medium sensitivity.

4. The apparatus of claim 3 wherein the means for activating the two-dimensional reflective LCD modulator uses a predetermined exposure time for reflective light and a selected power level to produce the proper exposure which matches medium sensitivity to produce proper exposure.

5. The apparatus of claim 3 further including a projection lens disposed between the second polarizer and the photosensitive medium.

6. The apparatus of claim 3 further including separate spectral filters for each LED disposed between the LED and the optical assembly.

7. The apparatus of claim 3 wherein the beam splitter provides a polarizing light function.

8. The apparatus of claim 3 further including means for manipulating the digital image in the digital image file to provide color correction, aperture correction, size, tone scale, uniformity, sharpening, file format conversion or combinations thereof.

9. The apparatus of claim 3 further including separate control means for each LED array for controlling the output power of the diodes in each LED array.

10. Apparatus for printing a plurality of frames wherein each such frame includes at least three separable color image planes from a digital image file of a color motion picture, comprising the steps of:

a) means for receiving and storing the digital image file of the motion picture sequence;

b) an activatable two-dimensional reflective LCD modulator having predetermined pixels in which different colored monochromatic visual images corresponding to each motion picture frame can be produced;

c) an image processing sub-system for manipulating the digital image data from the digital image file to produce predetermined affects to the visual image;

d) means for activating the two-dimensional reflective LCD modulator in response to the digital image data from the image processing sub-system so that reflective light will cause a visual image to be produced;

e) at least one array of spaced light-emitting diodes where such array contains at least three groups of light-emitting diodes at different color wavelength wherein each such color wavelength corresponds to an image plane;

f) an optical assembly for receiving light from each array and for distributing such light to provide a relatively uniform light beam;

g) a first polarizer responsive to the uniform light beam to polarize such uniform light beam;

h) a beam splitter for receiving the uniform polarized light beam and for directing a portion of the uniform polarized light beam onto the activated LCD modulator and for receiving and directing reflected light from the LCD modulator;

i) a second polarizer responsive to directed reflected light from the LCD modulator to minimize noise; and j) means for moving a photosensitive medium past the reflective light produced by the second polarizer to illuminate such medium for a sufficient time with the visual image planes to record such image planes on such medium at proper exposure which matches the medium sensitivity.

* * * * *